(12) United States Patent
Bhattad et al.

(10) Patent No.: US 10,454,520 B2
(45) Date of Patent: Oct. 22, 2019

(54) COVERAGE ENHANCEMENT AND NORMAL MODES SWITCHING RELATED OPTIMIZATION

(71) Applicant: QUALCOMM Incorporated, San Diego, CA (US)

(72) Inventors: Kapil Bhattad, Bangalore (IN); Hao Xu, Beijing (CN); Alberto Rico Alvarino, San Diego, CA (US); Peter Gaal, San Diego, CA (US); Masato Kitazoe, Hachiouji (JP); Sharad Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/670,697

(22) Filed: Aug. 7, 2017

(65) Prior Publication Data

US 2018/0097541 A1    Apr. 5, 2018

(30) Foreign Application Priority Data

Oct. 4, 2016   (IN) .............................. 201641033860

(51) Int. Cl.
*H04B 1/713* (2011.01)
*H04W 76/27* (2018.01)
(Continued)

(52) U.S. Cl.
CPC ............... *H04B 1/713* (2013.01); *H04L 1/00* (2013.01); *H04L 5/0012* (2013.01);
(Continued)

(58) Field of Classification Search
CPC ..... H04W 76/27; H04W 76/046; H04W 4/70; H04W 88/06; H04B 1/713;
(Continued)

(56) References Cited

U.S. PATENT DOCUMENTS

| 2016/0345118 A1* | 11/2016 | Oh ......................... H04W 4/70 |
| 2018/0069593 A1* | 3/2018 | Yi .......................... H04B 1/713 |
| 2018/0102806 A1* | 4/2018 | Yi .......................... H04B 1/713 |

FOREIGN PATENT DOCUMENTS

| WO | WO-2016119446 A1 | 8/2016 |
| WO | WO-2016144076 A1 | 9/2016 |

OTHER PUBLICATIONS

International Search Report and Written Opinion—PCT/US2017/045922—ISA/EPO—dated Jan. 23, 2018.

(Continued)

*Primary Examiner* — Syed Haider
(74) *Attorney, Agent, or Firm* — Norton Rose Fulbright LLP

(57) ABSTRACT

Coverage enhancements and coverage mode switching related optimizations are discussed for user equipments (UEs) that may switch between various coverage extension (CE) and non-CE modes of operation. In such enhancements, paging uncertainty and delays may be reduced by sending pages either simultaneously or using historical information over multiple coverage modes available to UEs. Random access procedures may be improved by providing CE mode random access procedures that are available when normal mode random access attempts fail and before declaring radio link failure. Additional aspects include improvements for more advanced UEs to improve coverage within normal mode operations by leveraging techniques used for narrowband CE mode operations, including transmission repetition and gapless transmission scheduling over hopped narrowband frequencies.

17 Claims, 9 Drawing Sheets

(51) Int. Cl.
  *H04L 1/00* (2006.01)
  *H04W 4/70* (2018.01)
  *H04L 5/00* (2006.01)
  *H04W 68/00* (2009.01)
  *H04B 1/7156* (2011.01)
  *H04W 88/06* (2009.01)
  *H04W 68/02* (2009.01)
  *H04W 68/04* (2009.01)
  *H04W 74/08* (2009.01)

(52) U.S. Cl.
  CPC .......... *H04L 5/0064* (2013.01); *H04L 5/0069* (2013.01); *H04L 5/0091* (2013.01); *H04W 4/70* (2018.02); *H04W 68/00* (2013.01); *H04W 76/27* (2018.02); *H04B 1/7156* (2013.01); *H04B 2001/71563* (2013.01); *H04L 5/0023* (2013.01); *H04W 68/02* (2013.01); *H04W 68/04* (2013.01); *H04W 74/0833* (2013.01); *H04W 88/06* (2013.01)

(58) Field of Classification Search
  CPC ........ H04B 2001/71563; H04B 1/7156; H04L 1/00; H04L 5/0064
  See application file for complete search history.

(56) References Cited

OTHER PUBLICATIONS

Mediatek In., "Discussion on PUCCH Transmission for Rel-13 MTC", 3GPP Draft; R1-152115 Discussion on PUCCH Transmission for Rel-13 MTC, 3rd Generation Partnership Project (3GPP), Mobile Competence Centre; 650, Route Des Lucioles; F-06921 Sophia-Antipolis Cedex, vol. RAN WG1, No. Belgrade; Apr. 20, 2015-Apr. 24, 2015, Apr. 19, 2015 (Apr. 19, 2015), XP050934959, 4 pages, Retrieved from the Internet: URL: http://WWW.3gpp.org/ftp/Meetings/3GPP/SYNC/RAN1/Docs/ [retrieved on Apr. 19, 2015].
Mediatek Inc: "Discussion on PUCCH Resource Allocation for MTC", 3GPP Draft; R1-154719 Discussion on PUCCH Resource Allocation for Rel-13 MTC, 3rd Generation Partnership Project (3GPP), Mobile Competence Centre; 650, Route Des Lucioles ; F-06921 Sophia-Antipolis Cedex, vol. RAN WG1, No. Beijing, China; Aug. 24, 2015-Aug. 28, 2015, Aug. 23, 2015 (Aug. 23, 2015), XP051001935, 4 pages, Retrieved from the Internet: URL: http://www.3gpp.org/ftp/Meetings_3GPP_SYNC/RAN1/Docs/ [retrieved on Aug. 23, 2015].

* cited by examiner

COVERAGE ENHANCEMENT AND NORMAL MODES SWITCHING RELATED OPTIMIZATION

CROSS-REFERENCE TO RELATED APPLICATIONS

This application claims the benefit of Indian Patent Application No. 201641033860, entitled, "COVERAGE ENHANCEMENT AND NORMAL MODES SWITCHING RELATED OPTIMIZATION," filed on Oct. 4, 2016, the disclosure of which is hereby incorporated by reference herein in its entirety as if fully set forth below and for all applicable purposes.

BACKGROUND

Field

Aspects of the present disclosure relate generally to wireless communication systems, and more particularly, to coverage enhancement and normal modes switching related optimization.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes switching a coverage mode, at a UE in idle mode, between a coverage enhancement (CE) mode and a non-CE mode, and transmitting a mode indicator from the UE, wherein the mode indicator identifies the coverage mode into which the UE switched.

In an additional aspect of the disclosure, a method of wireless communication includes detecting, at a base station, a paging opportunity for a UE served by the base station, and transmitting a page associated with the paging opportunity according to a CE mode of the UE and a non-CE mode of the UE.

In an additional aspect of the disclosure, a method of wireless communication includes monitoring, by a UE, for a page according to one coverage mode of a plurality of candidate coverage modes accessible to the UE, and initiating communication in response to detecting the page.

In an additional aspect of the disclosure, a method of wireless communication includes detecting, at a UE in idle mode, data for uplink transmission, performing a random access procedure according to a non-CE mode, determining a failure of the random access procedure, and performing the random access procedure according to a CE mode.

In an additional aspect of the disclosure, a method of wireless communication includes detecting, at a UE in idle mode, data for uplink transmission, performing a random access procedure simultaneously according to a CE mode and a non-CE mode, initiating communication according to one of the CE mode or the non-CE mode in response to detecting of a successful random access procedure on a corresponding one of: the CE mode or the non-CE mode, and initiating communication according to the non-CE mode in response to detecting the successful random access procedure on both of the CE mode and the non-CE mode.

In an additional aspect of the disclosure, a method of wireless communication includes detecting, at a UE in idle mode, data for uplink transmission, performing a random access procedure simultaneously according to a CE mode and a non-CE mode, initiating communication according to one of the CE mode or the non-CE mode in response to detecting of a successful random access procedure on a corresponding one of: the CE mode or the non-CE mode, and initiating communication according to the non-CE mode in response to detecting the successful random access procedure on both of the CE mode and the non-CE mode.

In an additional aspect of the disclosure, a method of wireless communication includes detecting, at a UE, channel coverage conditions below a predetermined threshold level, signaling, by the UE, to a serving base station a coverage extension condition, in response to the detecting, and receiving, by the UE, in response to the signaling the coverage extension condition, repeated copies of transmissions from the serving base station, wherein the repeated copies are repeated at a predetermined repetition factor.

In an additional aspect of the disclosure, a method of wireless communication includes detecting, at a UE, data for uplink transmission, wherein the UE is configured for wideband baseband processing, determining, at the UE, coverage conditions that support communications in a CE mode, wherein the CE mode includes narrowband frequency hopping for transmissions, and transmitting, by the UE, the data according to the narrowband frequency hopping, wherein the UE transmits the data without a gap between hopped frequencies.

In an additional aspect of the disclosure, a method of wireless communication includes determining, at a UE, that coverage conditions of the UE support narrowband frequency hopping for transmissions, wherein the narrowband frequency hopping includes uplink transmission of data without a gap between hopped frequencies, and indicating, in response to the determining, that the UE is configured with capabilities to support the narrowband frequency hopping without a gap.

In an additional aspect of the disclosure, an apparatus configured for wireless communications includes means for switching a coverage mode, at a UE in idle mode, between a CE mode and a non-CE mode, and means for transmitting a mode indicator from the UE, wherein the mode indicator identifies the coverage mode into which the UE switched.

In an additional aspect of the disclosure, an apparatus configured for wireless communications includes means for detecting, at a base station, a paging opportunity for a UE served by the base station, and means for transmitting a page associated with the paging opportunity according to a CE mode of the UE and a non-CE mode of the UE.

In an additional aspect of the disclosure, an apparatus configured for wireless communications includes means for monitoring, by a UE, for a page according to one coverage mode of a plurality of candidate coverage modes accessible to the UE, and means for initiating communication in response to detecting the page.

In an additional aspect of the disclosure, an apparatus configured for wireless communications includes means for detecting, at a UE in idle mode, data for uplink transmission, means for performing a random access procedure according to a non-CE mode, means for determining a failure of the random access procedure, and means for performing the random access procedure according to a CE mode.

In an additional aspect of the disclosure, an apparatus configured for wireless communications includes means for detecting, at a UE in idle mode, data for uplink transmission, means for performing a random access procedure simultaneously according to a CE mode and a non-CE mode, means for initiating communication according to one of the CE mode or the non-CE mode in response to detecting of a successful random access procedure on a corresponding one of: the CE mode or the non-CE mode, and means for initiating communication according to the non-CE mode in response to detecting the successful random access procedure on both of the CE mode and the non-CE mode.

In an additional aspect of the disclosure, an apparatus configured for wireless communications includes means for detecting, at a UE in idle mode, data for uplink transmission, means for performing a random access procedure simultaneously according to a CE mode and a non-CE mode, means for initiating communication according to one of the CE mode or the non-CE mode in response to detecting of a successful random access procedure on a corresponding one of: the CE mode or the non-CE mode, and means for initiating communication according to the non-CE mode in response to detecting the successful random access procedure on both of the CE mode and the non-CE mode.

In an additional aspect of the disclosure, an apparatus configured for wireless communications includes means for detecting, at a UE, channel coverage conditions below a predetermined threshold level, means for signaling, by the UE, to a serving base station a coverage extension condition, in response to the detecting, and means for receiving, by the UE, in response to the signaling the coverage extension condition, repeated copies of transmissions from the serving base station, wherein the repeated copies are repeated at a predetermined repetition factor.

In an additional aspect of the disclosure, an apparatus configured for wireless communications includes means for detecting, at a UE, data for uplink transmission, wherein the UE is configured for wideband baseband processing, means for determining, at the UE, coverage conditions that support communications in a CE mode, wherein the CE mode includes narrowband frequency hopping for transmissions, and means for transmitting, by the UE, the data according to the narrowband frequency hopping, wherein the UE transmits the data without a gap between hopped frequencies.

In an additional aspect of the disclosure, an apparatus configured for wireless communications includes means for determining, at a UE, that coverage conditions of the UE support narrowband frequency hopping for transmissions, wherein the narrowband frequency hopping includes uplink transmission of data without a gap between hopped frequencies, and means for indicating, in response to the means for determining, that the UE is configured with capabilities to support the narrowband frequency hopping without a gap.

In an additional aspect of the disclosure, a non-transitory computer-readable medium is provided having program code recorded thereon. The program code further includes code to switch a coverage mode, at a UE in idle mode, between a CE mode and a non-CE mode, and code to transmit a mode indicator from the UE, wherein the mode indicator identifies the coverage mode into which the UE switched.

In an additional aspect of the disclosure, an apparatus configured for wireless communications includes code to detect, at a base station, a paging opportunity for a UE served by the base station, and code to transmit a page associated with the paging opportunity according to a CE mode of the UE and a non-CE mode of the UE.

In an additional aspect of the disclosure, an apparatus configured for wireless communications includes code to monitor, by a UE, for a page according to one coverage mode of a plurality of candidate coverage modes accessible to the UE, and code to initiate communication in response to detecting the page.

In an additional aspect of the disclosure, an apparatus configured for wireless communications includes code to detect, at a UE in idle mode, data for uplink transmission, code to perform a random access procedure according to a non-CE mode, code to determine a failure of the random access procedure, and code to perform the random access procedure according to a CE mode.

In an additional aspect of the disclosure, an apparatus configured for wireless communications includes code to detect, at a UE in idle mode, data for uplink transmission, code to perform a random access procedure simultaneously according to a CE mode and a non-CE mode, code to initiate communication according to one of the CE mode or the non-CE mode in response to detecting of a successful random access procedure on a corresponding one of: the CE mode or the non-CE mode, and code to initiate communication according to the non-CE mode in response to detecting the successful random access procedure on both of the CE mode and the non-CE mode.

In an additional aspect of the disclosure, an apparatus configured for wireless communications includes code to detect, at a UE in idle mode, data for uplink transmission, code to perform a random access procedure simultaneously according to a CE mode and a non-CE mode, code to initiate communication according to one of the CE mode or the non-CE mode in response to detecting of a successful random access procedure on a corresponding one of: the CE mode or the non-CE mode, and code to initiate communication according to the non-CE mode in response to detecting the successful random access procedure on both of the CE mode and the non-CE mode.

In an additional aspect of the disclosure, an apparatus configured for wireless communications includes code to detect, at a UE, channel coverage conditions below a predetermined threshold level, code to signal, by the UE, to a serving base station a coverage extension condition, in response to the detecting, and code to receive, by the UE, in response to the signaling the coverage extension condition, repeated copies of transmissions from the serving base station, wherein the repeated copies are repeated at a predetermined repetition factor.

In an additional aspect of the disclosure, an apparatus configured for wireless communications includes code to detect, at a UE, data for uplink transmission, wherein the UE is configured for wideband baseband processing, code to determine, at the UE, coverage conditions that support communications in a CE mode, wherein the CE mode includes narrowband frequency hopping for transmissions, and code to transmit, by the UE, the data according to the narrowband frequency hopping, wherein the UE transmits the data without a gap between hopped frequencies.

In an additional aspect of the disclosure, an apparatus configured for wireless communications includes code to determine, at a UE, that coverage conditions of the UE support narrowband frequency hopping for transmissions, wherein the narrowband frequency hopping includes uplink transmission of data without a gap between hopped frequencies, and code to indicate, in response to the determination, that the UE is configured with capabilities to support the narrowband frequency hopping without a gap.

In an additional aspect of the disclosure, an apparatus configured for wireless communication is disclosed. The apparatus includes at least one processor, and a memory coupled to the processor. The processor is configured to switch a coverage mode, at a UE in idle mode, between a CE mode and a non-CE mode, and code to transmit a mode indicator from the UE, wherein the mode indicator identifies the coverage mode into which the UE switched.

In an additional aspect of the disclosure, an apparatus configured for wireless communication is disclosed. The apparatus includes at least one processor, and a memory coupled to the processor. The processor is configured to detect, at a base station, a paging opportunity for a UE served by the base station, and to transmit a page associated with the paging opportunity according to a CE mode of the UE and a non-CE mode of the UE.

In an additional aspect of the disclosure, an apparatus configured for wireless communication is disclosed. The apparatus includes at least one processor, and a memory coupled to the processor. The processor is configured to monitor, by a UE, for a page according to one coverage mode of a plurality of candidate coverage modes accessible to the UE, and to initiate communication in response to detecting the page.

In an additional aspect of the disclosure, an apparatus configured for wireless communication is disclosed. The apparatus includes at least one processor, and a memory coupled to the processor. The processor is configured to detect, at a UE in idle mode, data for uplink transmission, to perform a random access procedure according to a non-CE mode, to determine a failure of the random access procedure, and to perform the random access procedure according to a CE mode.

In an additional aspect of the disclosure, an apparatus configured for wireless communication is disclosed. The apparatus includes at least one processor, and a memory coupled to the processor. The processor is configured to detect, at a UE in idle mode, data for uplink transmission, to perform a random access procedure simultaneously according to a CE mode and a non-CE mode, to initiate communication according to one of the CE mode or the non-CE mode in response to detecting of a successful random access procedure on a corresponding one of: the CE mode or the non-CE mode, and to initiate communication according to the non-CE mode in response to detecting the successful random access procedure on both of the CE mode and the non-CE mode.

In an additional aspect of the disclosure, an apparatus configured for wireless communication is disclosed. The apparatus includes at least one processor, and a memory coupled to the processor. The processor is configured to detect, at a UE in idle mode, data for uplink transmission, to perform a random access procedure simultaneously according to a CE mode and a non-CE mode, to initiate communication according to one of the CE mode or the non-CE mode in response to detecting of a successful random access procedure on a corresponding one of: the CE mode or the non-CE mode, and to initiate communication according to the non-CE mode in response to detecting the successful random access procedure on both of the CE mode and the non-CE mode.

In an additional aspect of the disclosure, an apparatus configured for wireless communication is disclosed. The apparatus includes at least one processor, and a memory coupled to the processor. The processor is configured to detect, at a UE, channel coverage conditions below a predetermined threshold level, to signal, by the UE, to a serving base station a coverage extension condition, in response to the detecting, and to receive, by the UE, in response to the signaling the coverage extension condition, repeated copies of transmissions from the serving base station, wherein the repeated copies are repeated at a predetermined repetition factor.

In an additional aspect of the disclosure, an apparatus configured for wireless communication is disclosed. The apparatus includes at least one processor, and a memory coupled to the processor. The processor is configured to detect, at a UE, data for uplink transmission, wherein the UE is configured for wideband baseband processing, to determine, at the UE, coverage conditions that support communications in a CE mode, wherein the CE mode includes narrowband frequency hopping for transmissions, and to transmit, by the UE, the data according to the narrowband frequency hopping, wherein the UE transmits the data without a gap between hopped frequencies.

In an additional aspect of the disclosure, an apparatus configured for wireless communication is disclosed. The apparatus includes at least one processor, and a memory coupled to the processor. The processor is configured to determine, at a UE, that coverage conditions of the UE support narrowband frequency hopping for transmissions, wherein the narrowband frequency hopping includes uplink transmission of data without a gap between hopped frequencies, and to indicate, in response to the determination, that the UE is configured with capabilities to support the narrowband frequency hopping without a gap.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
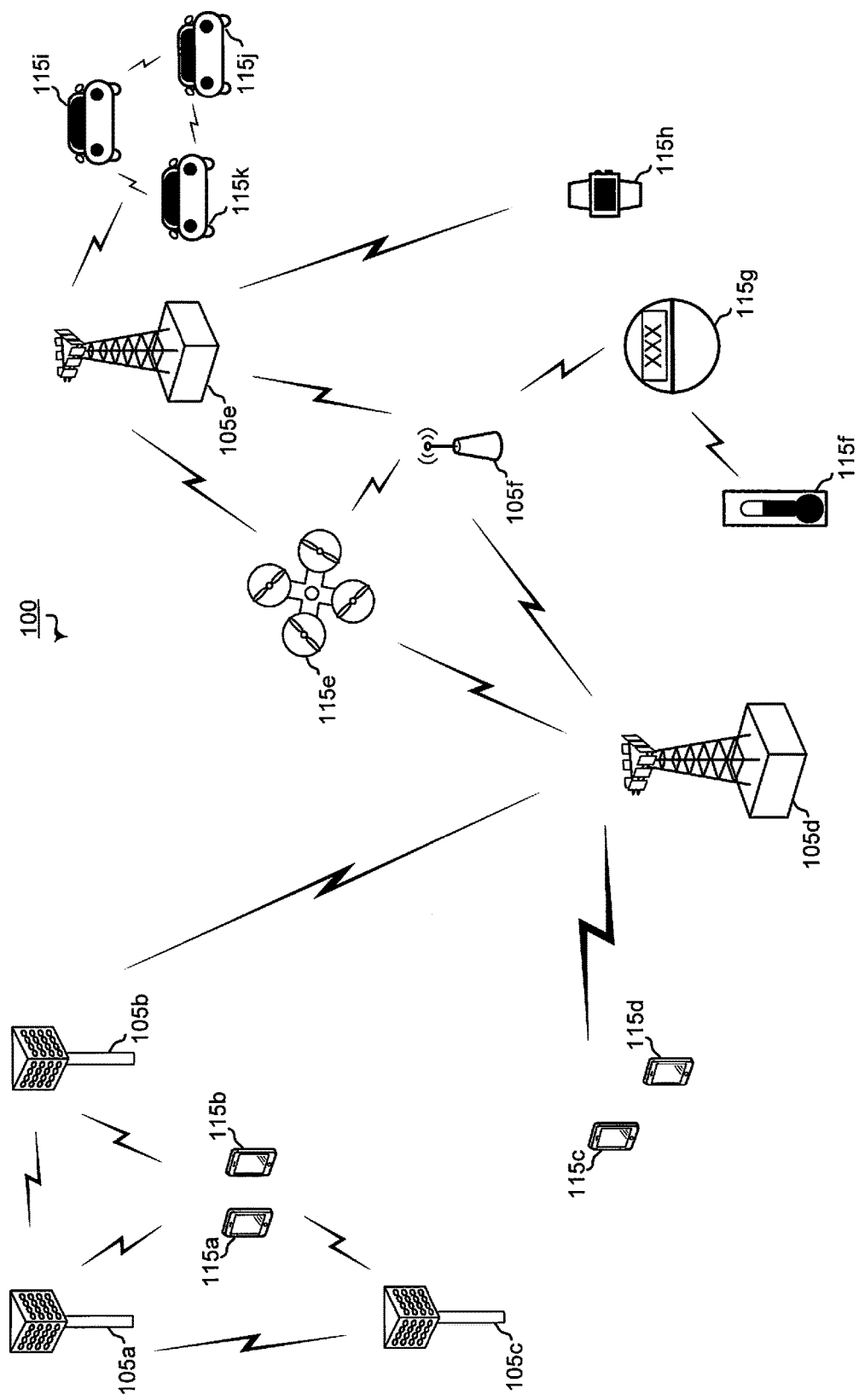
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 50 network 100 including various base stations and UEs configured according to aspects of the present disclosure. The 5G network 100 includes a number of base stations 105 and other network entities. A base station may be a station that communicates with the UEs and may also be referred to as a base station, an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. UEs 115a-115d are examples of mobile smart phone-type devices accessing 5G network 100. A UE may also be a machine specifically configured for connected communication, including machine type communication (MTC), enhanced MTC (eMTC), narrowband IoT (NB-IoT) and the like. UEs 115c-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through 5G network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. 5G network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
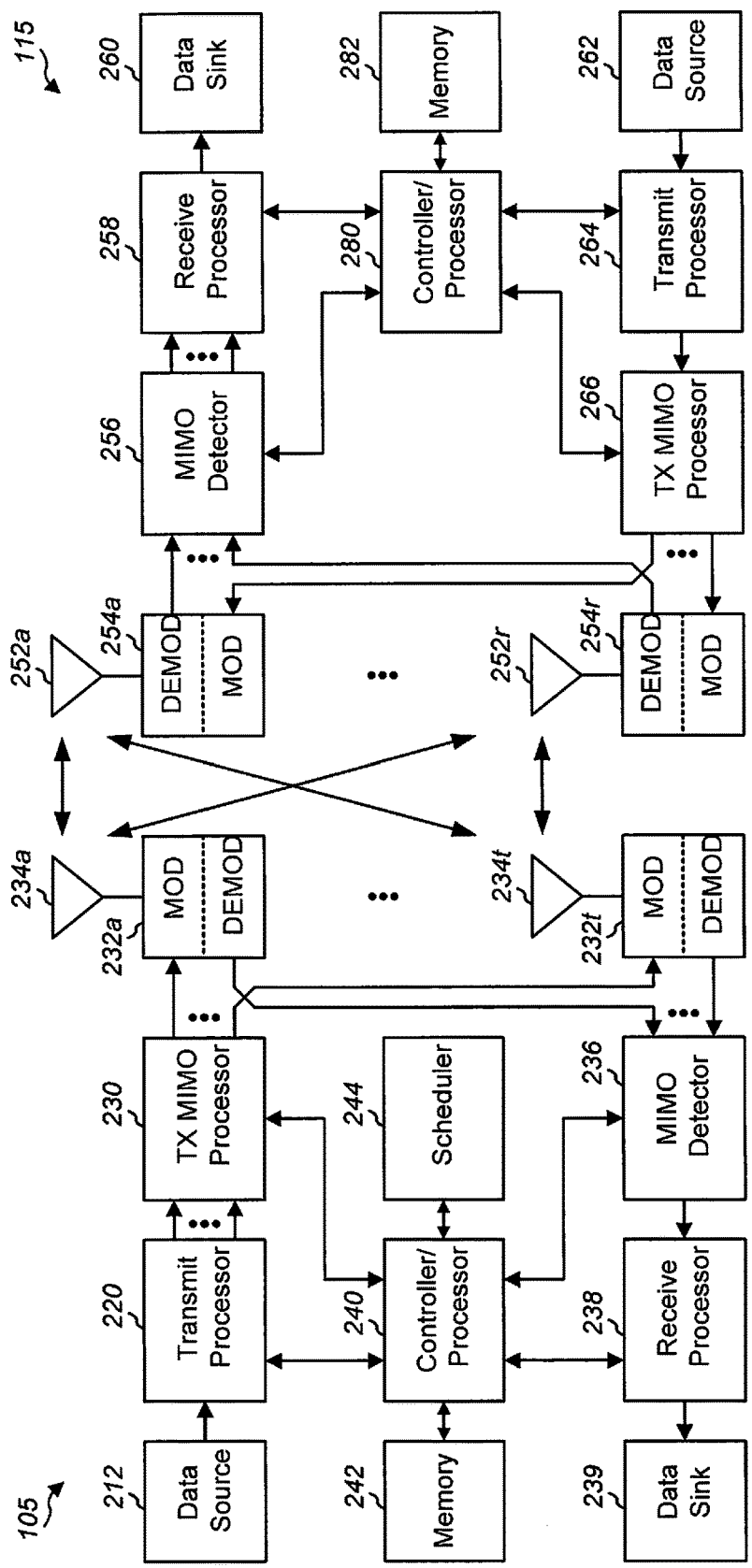
FIG. 2 is a block diagram conceptually illustrating a design of a base station and a UE configured according to one aspect of the present disclosure.

FIG. 2 shows a block diagram of a design of a base station 105 and a U E 115, which may be one of the base stations and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4-10, and/or other processes for the techniques described herein. The memories 242 and 282 may store data and program codes for the base station 105 and the UE 115, respectively. A scheduler 244 may schedule UEs for data transmission on the downlink and/or uplink.

With the trends towards universal connectivity and the increase of more machines and devices having wireless capabilities for reporting data or other low level communications, 3GPP have proposed new access technologies to accommodate more machine-type communications in the enhanced machine-type communication (eMTC) and narrow band Internet of things (NB-IoT) standards in Rels. 12 and 13. Considering the context for these technologies, the devices specifically designed for this type of communication may be lower cost, lower complexity devices, that may be positioned in remote and inhospitable places, thus, increasing the need for longer battery life and the ability to provide some communication coverage in very low signal-to-noise ratio (SNR) environments. At the same time, these devices may not need to perform some of the more advance features of modern smart phones.

Accordingly, the standards proposed for access technologies, such as eMTC and NB-IoT, provide for increased power management to improve power consumption and, therefore, battery life, while using lower cost components. Narrowing the operational bandwidth allows for the lower cost components to facilitate communications in such low SNR environments while still allowing deployment in any LTE spectrum and coexistence with other LTE services within the same bandwidths. As currently suggested, eMTC operates with enhanced coverage within a 1.08 MHz bandwidth, while NB-IoT operates with enhanced coverage within an even smaller 180 kHz bandwidth, as compared with LTE's normal mode, which also supports larger operational bandwidths, such as 3, 5, 10, 15, and 20 MHz. While normal mode LTE networks may support some similar operational bandwidths, e.g., 1 MHz, it does not support normal mode operations at the same lower SNRs that eMTC and NB-IoT offer in their extended coverage abilities.

While eMTC and NB-IoT were proposed to accommodate communications from lower-cost and lower-complexity devices, regular LTE UEs may also be configured to take advantage of the additional technologies in order to extend the coverage of existing LTE communications. As such, regular LTE UEs may include both a normal mode, which operates using the typical coverage provided by the standard LTE procedures (e.g., using PDCCH/PDSCH), and a coverage extension (CE) mode, which provides extended coverage according to the more MTC-style procedures (e.g., using NPDCCH/NPDSCH or MPDCCH/MPDSCH, which have lower code rate/repetitions).

In idle mode, such a UE may switch between CE mode and non-CE mode based on its channel quality measurements. However, the network may not be aware of which mode the UE is in. This may cause problems when the network sends pages for the UE. When in the normal mode, the network will send UE pages via the PDCCH, which the idle mode UE will be monitoring, while in CE mode, the network would send UE pages in a narrowband-PDCCH (NPDCCH). If the network does not know which mode the UE currently resides, it may send pages in a PDCCH that the UE is not monitoring, which may cause a delay in communications. Various aspects of the present disclosure are directed to accommodating UEs in either normal mode or CE mode without incurring unnecessary communication delays.

Figure 3:
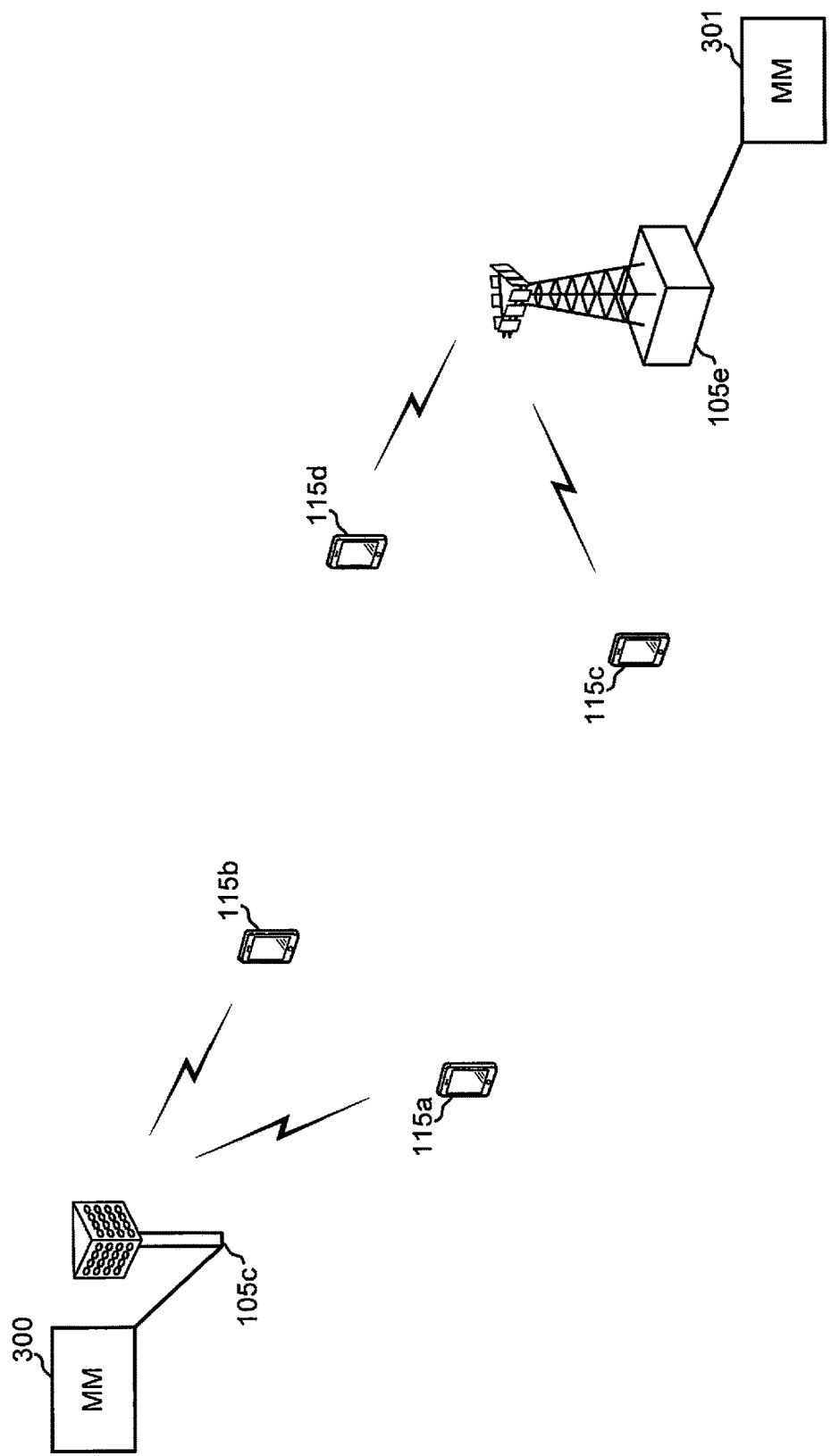
FIG. 3 is a block diagram illustrating base stations and UEs, all configured according to various aspects of the present disclosure.

FIG. 3 is a block diagram illustrating base stations 105c and 105e and UEs 115a-115d, all configured according to various aspects of the present disclosure. UEs 115a-115d may switch between various coverage modes depending on the communication conditions experienced at the UEs. In one example aspect, UEs 115a-115d make the network aware of the particular mode the UE is in. In such aspect, a new RRC connection may be established in which UEs 115a-115c send "dummy" non-access stratum (NAS) messages that inform mobility management (MM) function entities 300 and 301, respectively, through the serving base station, base stations 105c and 105e, of the change in coverage. MM function entities 300 and 301 may include various nodes or functionalities exercised by various nodes. For example, in LTE operations, MM function entities 300 and 301 may include mobility management entities (MMEs), while in 5G NR operations, the mobility management functions includes network nodes or entities that provide the access and mobility management function (AMF) with both the security context management function (SCMF) and secure anchor function (SEAF). Alternatively, instead of transmitting a NAS message, UE 115a-d may transmit an RRC message to base stations 105c and 105e, respectively, indicating the new coverage mode, and base station 105c and 105e would generate the NAS message to MM function entities 300 and 301, respectively.

Figure 4:
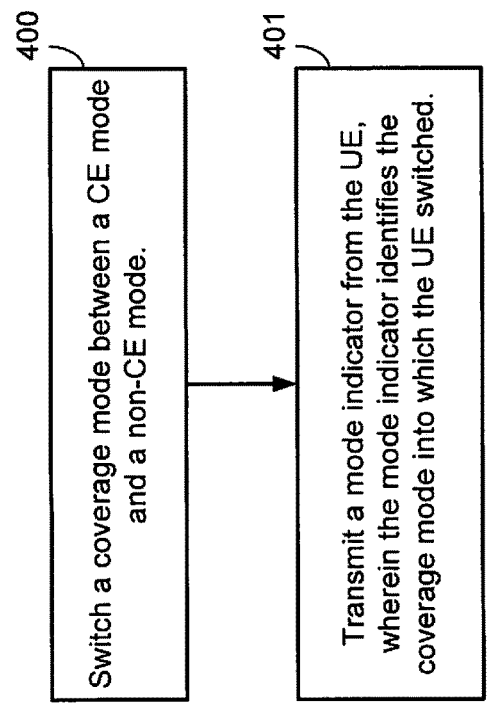
FIG. 4 is a block diagram illustrating example blocks executed to implement one aspect of the present disclosure.

FIG. 4 is a block diagram illustrating example blocks executed to implement one aspect of the present disclosure. The example blocks will also be described with respect to base station 105 and UE 115, as illustrated in FIGS. 11 and 12, respectively.

Figure 11:
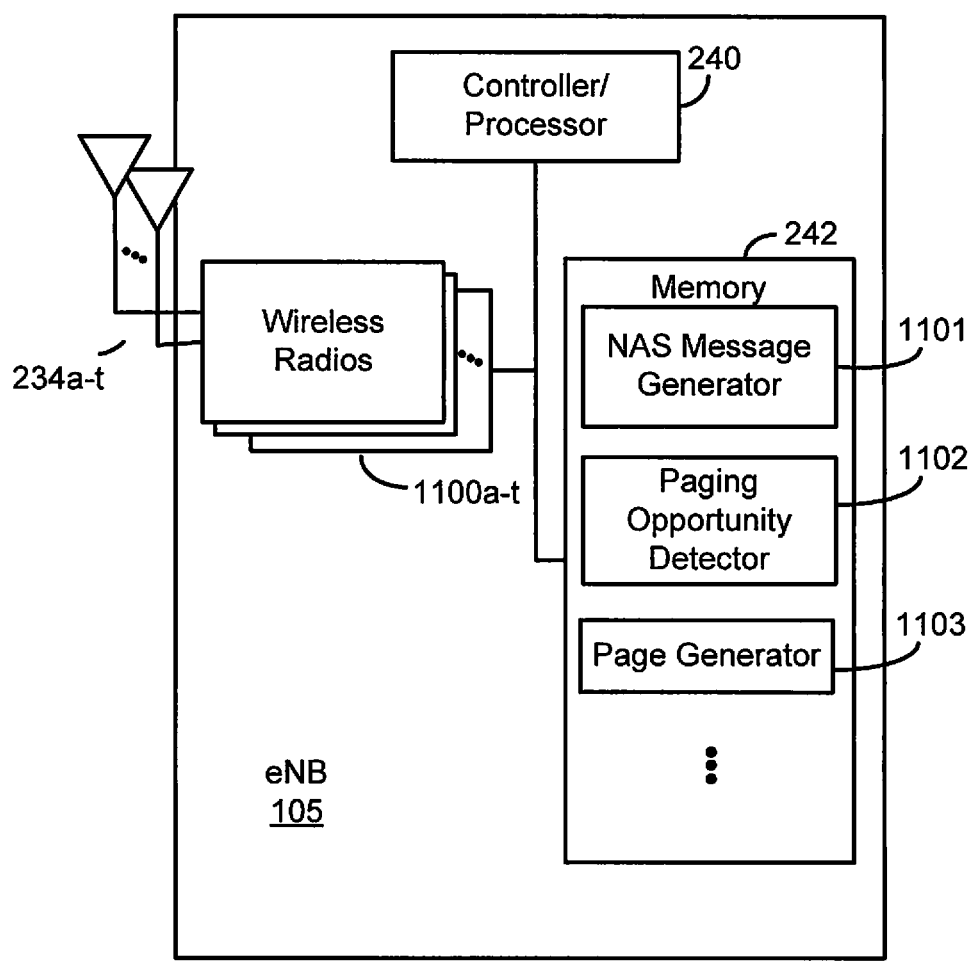
FIG. 11 is a block diagram illustrating a base station configured according to one aspect of the present disclosure.
Figure 12:
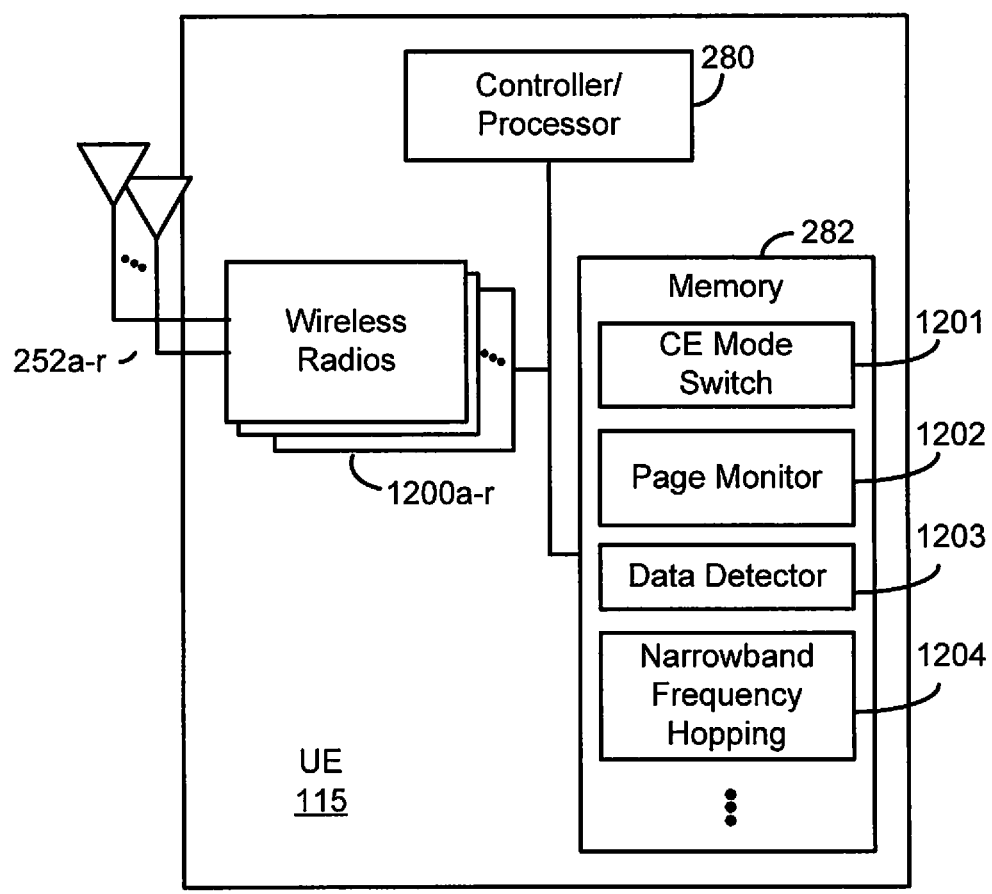
FIG. 12 is a block diagram illustrating an UE configured according to one aspect of the present disclosure.

FIG. 11 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1100a-t and antennas 234a-t. Wireless radios 1100a-t include various components and hardware, as illustrated in FIG. 2 for base station 105, including modulator/demodulators 232a-t, MIMO detector 236, receive processor 238, transmit processor 220, and TX MIMO processor 230. FIG. 12 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1200a-r and antennas 252a-r. Wireless radios 1200a-r include various components and hardware, as illustrated in FIG. 2 for base station 105, including modulator/demodulators 254a-r, MIMO detector 256, receive processor 258, transmit processor 264, and TX MIMO processor 266.

At block 400, a UE switches coverage modes between a CE mode and a non-CE mode. For example, UE 115 may enter a basement or other subterranean room with very low coverage capability. UE 115, under control of controller/processor 280, activates CE mode switch 1201, stored in memory 282. The execution environment of CE mode switch 1201 allows UE 115 to switch from non-CE mode to CE mode.

At block 401, the UE transmits a mode indicator, wherein the mode indicator identifies the coverage mode into which the UE has switched. For example, in the first example aspect, the mode indicator may be the "dummy" NAS message sent from a UE, such as UE 115, to base station 105. UE 115 may send the "dummy" NAS message using antennas 252a-r and wireless radios 1200a-r. Base station may receive the "dummy" NAS message via antennas 234a-t and wireless radios 1100a-t. Base station 105 would then forward the "dummy" NAS message to MM function entity 301, which informs MM function entity 301 of the new coverage mode for UE 115c.

In a second example aspect, as noted above, instead of UE 115 transmitting the "dummy" NAS message, UE 115 will transmit an RRC message to base station 105 indicating the new coverage mode change for UE 115 (e.g., change to CE mode). UE 115 may send the RRC message using antennas 252a-r and wireless radios 1200a-r. Base station 105, based on the receipt of the RRC message from UE 115, will then, under control of controller/processor 240, activate NAS message generator 1101, stored in memory 242. The execution environment of NAS message generator 1101 allows for the generation of a NAS message for transmission from base station 105 via wireless radios 1100a-t and antennas 234a-t to MM function entity 301, informing MM function entity 301 of the changed coverage mode. Accordingly, MM function entity 301 will provide paging to UE 115 using the appropriate coverage mode.

Figure 5:
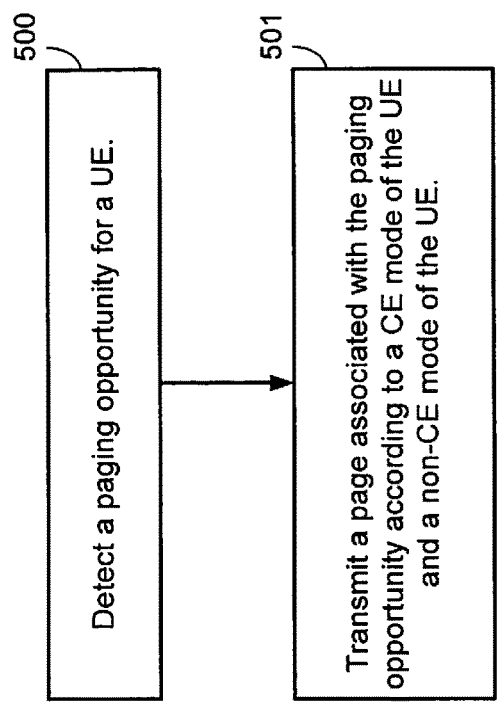
FIG. 5 is a block diagram illustrating example blocks executed to implement one aspect of the present disclosure.

FIG. 5 is a block diagram illustrating example blocks executed to implement one aspect of the present disclosure. The example blocks will also be described with respect to base station 105 and UE 115, as illustrated in FIGS. 11 and 12, respectively. At block 500, a base station detects a paging opportunity for a UE being served by the base station. For example, MM function entity 300 (FIG. 3) may send a paging message to base station 105 identifying UE 115 with data for downlink. Base station 105, under control of controller/processor 240, may activate paging opportunity detector 1102, stored in memory 242. The execution environment of paging opportunity detector 1102 allows UE to detect a paging opportunity to page UE 115.

At block 501, a base station may transmit a page associated with the paging opportunity according to a CE mode of the UE and a non-CE mode of the UE. For example, base station 105, under control of controller/processor 240, may activate page generator 1103, stored in memory 242. The execution environment of page generator 1103 allows base station 105 to generate a page and may schedule paging transmissions, via wireless radios 1100*a-t* and antennas 234*a-t*, for UE 115. Without direct knowledge of the mode that UE 115 is in, unlike the aspect illustrated in FIG. 4, paging by base station 105 may be enhanced to accommodate the particular mode that UE 115 is in. When the network is not aware of the UE mode, the network may first page UE 115 in its last known mode. For example, the execution environment of page generator 1103 may allow base station 105 to page UE 115 in the last known mode of UE 115. Thus, if the last known mode was a CE mode, then base station 105 will transmit pages according to the CE mode. Otherwise if the last known mode was a non-CE mode, then base station 105 will transmit pages according to the non-CE mode. If UE 115 does not respond when paged in this last-known mode, then the network, through base station 105, pages in the other available modes. In one aspect, base station 105 may page UE 115 multiple times in the last known mode before trying a different mode.

In a second alternative implementation of block 501, base station 105 may send pages over several of the available modes, (e.g., both non-CE mode and CE mode). For example, the execution environment of page generator 1103 may allow base station 105 to send page transmissions to UE 115, via wireless radios 1100*a-t* and antennas 234*a-t*, in several of the available modes. This process reduces delay of UE 115 receiving the page compared to the previous option that sequentially tries the last known mode first. The network may select to duplicate the pages in multiple coverage modes based on UE 115's capabilities, the type of traffic from communication, and the like.

Figure 6:
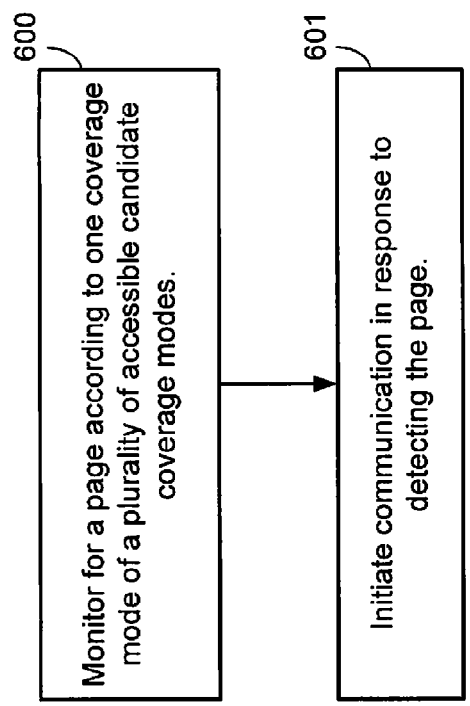
FIG. 6 is a block diagram illustrating example blocks executed according to one aspect of the present disclosure.

FIG. 6 is a block diagram illustrating example blocks executed according to one aspect of the present disclosure. The example blocks will also be described with respect to base station 105 and UE 115, as illustrated in FIGS. 11 and 12, respectively. At block 600, a UE monitors for a page according to one coverage mode of a plurality of accessible candidate coverage modes. For example, UE 115, under control of controller/processor 280, activates page monitor 1202, stored in memory 282. The execution environment of page monitor 1202 allows UE 115 to monitor for pages only over the normal, non-CE mode avenues. Thus, whether UE 115 is operating in the non-CE mode or CE mode, it will only monitor the normal, non-CE mode avenue for paging. The monitor mode may be known to the network, thus, base station 105 may transmit pages for UE 115 over the non-CE mode. For example, base station 105 may transmit pages, via wireless radios 1100*a-t* and antennas 234*a-t*, to be received via wireless radios 1200*a-r* and antennas 252*a-r* by UE 115.

In another example aspect, the network may page the UE in multiple available modes at the same time. Thus, in addition to the one mode being monitored in block 600, additional modes may be selected for additional monitoring. When the network knows that UE 115 may be in any number of different modes, base station 105 may use all of those modes to transmit pages. This aspect allows UE 115 to detect the pages, for example under the executable environment of page monitor 1202, regardless of what mode it is in, which reduces the delay that may be present in sequentially paging based on last known mode. The network may select the particular UEs whose page is detected to duplicate based on UE capability, type to traffic, and the like.

At block 601, the UE initiates communication in response to detecting the page. For example, UE 115 may initiate communications via wireless radios 1200*a-r* and antennas 252*a-r* with base station 115. In the aspects in which UE 115 is only monitoring a single mode, the communication is begun on that mode when the page is detected. In the other aspects where UE 115 monitors multiple modes, communication is initiated on the mode where the page is detected or if pages are detected in multiple modes, UE 115 may give priority to the modes that offer higher data rates, larger bandwidth, better coverage, or the like.

In aspects of the present disclosure, UE 115 monitors pages in more than one mode. UE 115 may simply monitor all potentially available coverages mode avenues that are accessible to it, or it can determine which of the available modes to monitor based on its expectation of performance in each of the modes in current channel conditions, power consumption considerations, and its ability to monitor multiple modes simultaneously.

In order to monitor for pages or perform RACH, a UE, such as UE 115, uses various paging parameters (e.g., paging configuration, PRACH configuration, PUSCH/PDSCH common configurations, etc.) decoded from system information block (SIB) messages, broadcast from serving base stations, such as base station 105. For non-CE mode paging and PRACH, parameters are sent over SIB1, while paging parameters for CE mode paging are broadcast on SIB1-BR. SIB1 is broadcast by base station 105 using normal non-CE mode PHY channels, while SIB1-BR is broadcast by base station 105 using CE mode PHY channels. However, the specific elements included in each SIB may be different. For example, SIB1 sent on normal non-CE mode PHY channels may not include paging/RACH information related to CE mode and vice-versa. If UE 115 switches between normal and CE modes, it would have to decode the SIB1-BR to be able to monitor the pages and to perform RACH.

Thus, in order to simplify implementation of UE 115 and reduce latency, both SIB1 and SIB1-BR broadcast from base station 105 may contain the paging parameters for both normal coverage and extended coverage. Some critical parameters that are optional to include in SIB1, but are needed for the other modes, such as CE mode, may be included, making it unnecessary to read the SIB1-BR if SIB1 is read in the normal mode.

With additional available modes, any additional parameters that would be used for those other modes may also be included in SIB1. Thus, a switch to a new mode may not require additional time for decoding the corresponding SIB for the particular paging parameters.

Figure 7:
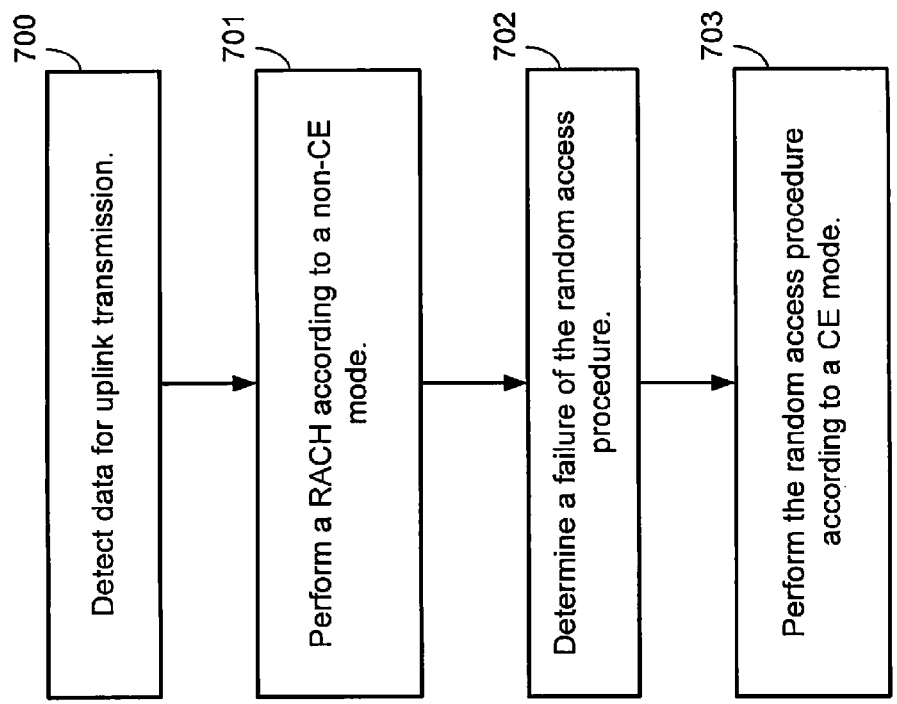
FIG. 7 is a block diagram illustrating example blocks executed to implement one aspect of the present disclosure.

FIG. 7 is a block diagram illustrating example blocks executed to implement one aspect of the present disclosure. At block 700, a UE detects data for uplink communication. For example, a UE, such as UE 115, determines that it has data for uplink communication. There may be scenarios where UE 115 is in normal coverage based on downlink measurements. However, a random access channel (RACH) attempt for uplink communication using the normal mode fails because the uplink coverage has more need of extended coverage.

At block 701, the UE performs a RACH according to a non-CE mode. For example, in the additional aspect of FIG. 7, UE 115 would first attempt RACH in the normal, non-CE mode. At block 702, the UE determines a failure of the random access procedure. Once UE 115 attempts RACH in the normal mode, it detects RACH failure. Each RACH attempt may include multiple PRACH transmissions with varying power levels, and would be considered successful if a random access response is received corresponding to the PRACH. A RACH process failure may be declared after a certain number of attempts for RACH have failed or the RACH is not successful in a certain amount of time. In one aspect, in the normal mode, UE 115 monitors for the random access response (e.g., the PRACH) from a base station, such as base station 105, over PDCCH. In another aspect, in the CE mode, UE 115 monitors the PRACH over N-PDCCH. At block 703, when failure of the RACH in the non-CE mode is detected, UE 115 performs the random access procedure according to a CE mode.

In one aspect, to reduce delay, UE 115 may use a history of previous channel condition measurements and RACH success with base station 105 to perform RACH directly in the CE mode. Thus, when the review of previous channel conditions and previous RACH success in either non-CE or CE modes indicates that UE 115 may be more likely to have RACH success with base station 105 in CE mode, UE 115 will switch to CE mode without first attempting non-CE mode RACH first.

Figure 8:
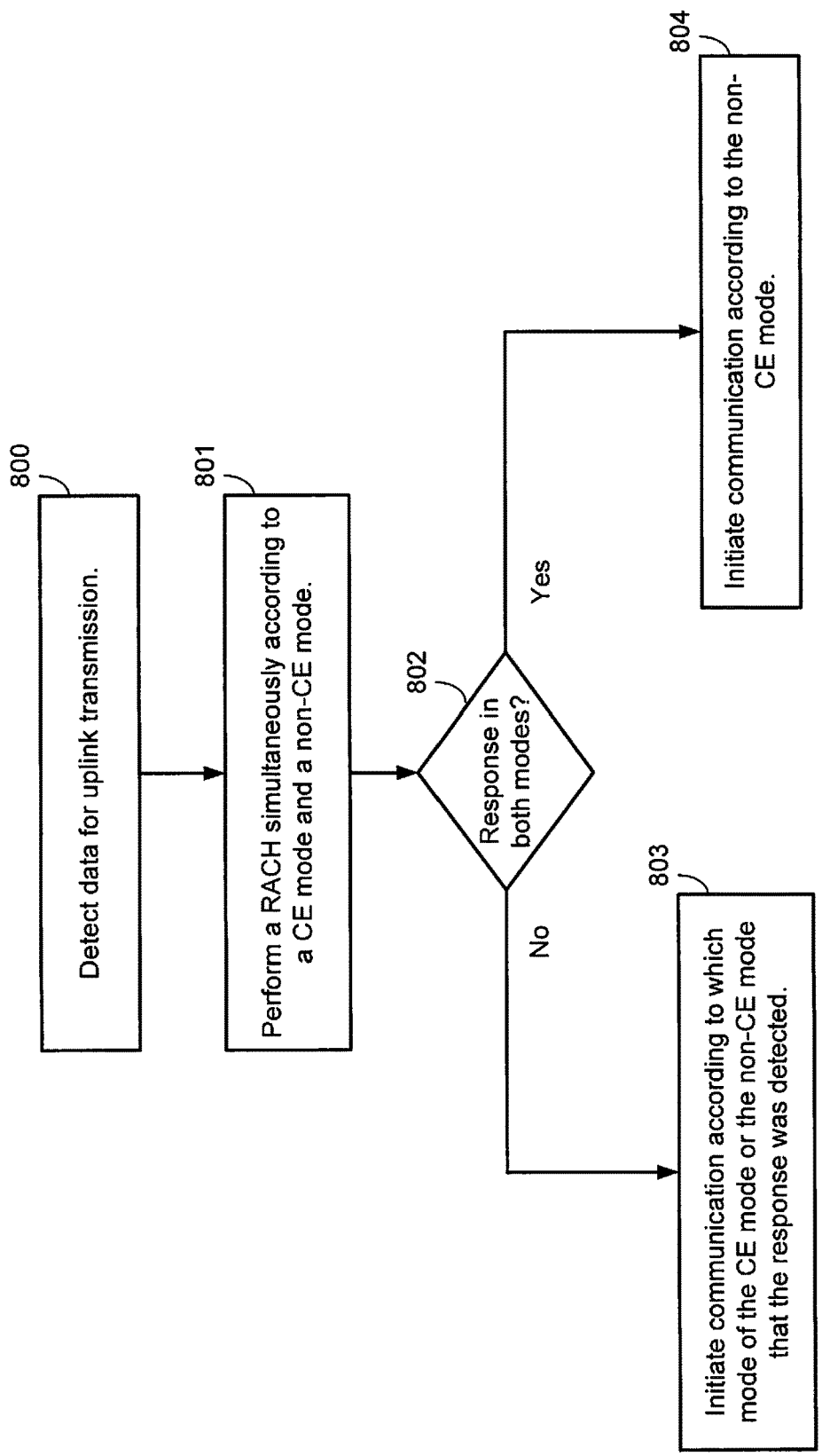
FIG. 8 is a block diagram illustrating example blocks executed to implement one aspect of the present disclosure.

FIG. 8 is a block diagram illustrating example blocks executed to implement one aspect of the present disclosure. In additional aspects of the present disclosure, if the UE is capable of simultaneous RACH, it may attempt simultaneous RACH in multiple modes (e.g., CE and non-CE modes).

At block 800, the UE detects data available for uplink transmission. At block 801, the UE performs a RACH procedure simultaneously according to a CE mode and a non-CE mode. For example, UE 115, with data for uplink transmission, performs RACH over both CE and non-CE modes. At block 802, a determination is made whether responses are detected on only one of the modes or whether responses are detected on both modes. If only one response is detected, then, at block 803, communication is initiated according to on which of the CE or non-CE modes the response was detected. For example, if UE 115 detects response on the RACH performed on the CE mode, then communication would be initiated on the CE mode. If UE 115 detects the response on the RACH on the non-CE mode, then communication would be initiated there instead.

If responses were detected on both modes at block 802, then, at block 804, the UE initiates communications according to the non-CE mode. For example, if UE 115 detects responses on both modes, then the non-CE mode may be prioritized over the CE mode because of the greater bandwidth and/or higher data rates available on the normal mode.

The extended coverage enhancements introduced in the machine-type standards are currently defined for narrowband operation. Thus, the UE/base station operating in a coverage enhancement mode would rely on narrowband communications. In the case of NB-IoT, these narrowband channels span 180 kHz only. Accordingly, in order for a UE, such as a smartphone to support coverage enhancements, the UE would need to support the specific narrowband. One procedure within NB-IoT used to increase coverage enhancement is to provide repeating uplink and downlink transmissions. Thus, using a repetition factor communicated between the UE and base station, transmissions, such as PDCCH, PDSCH, PUSCH, PUCCH, and the like, are repetitively transmitted according to the repetition factor.

Figures 9, 10:
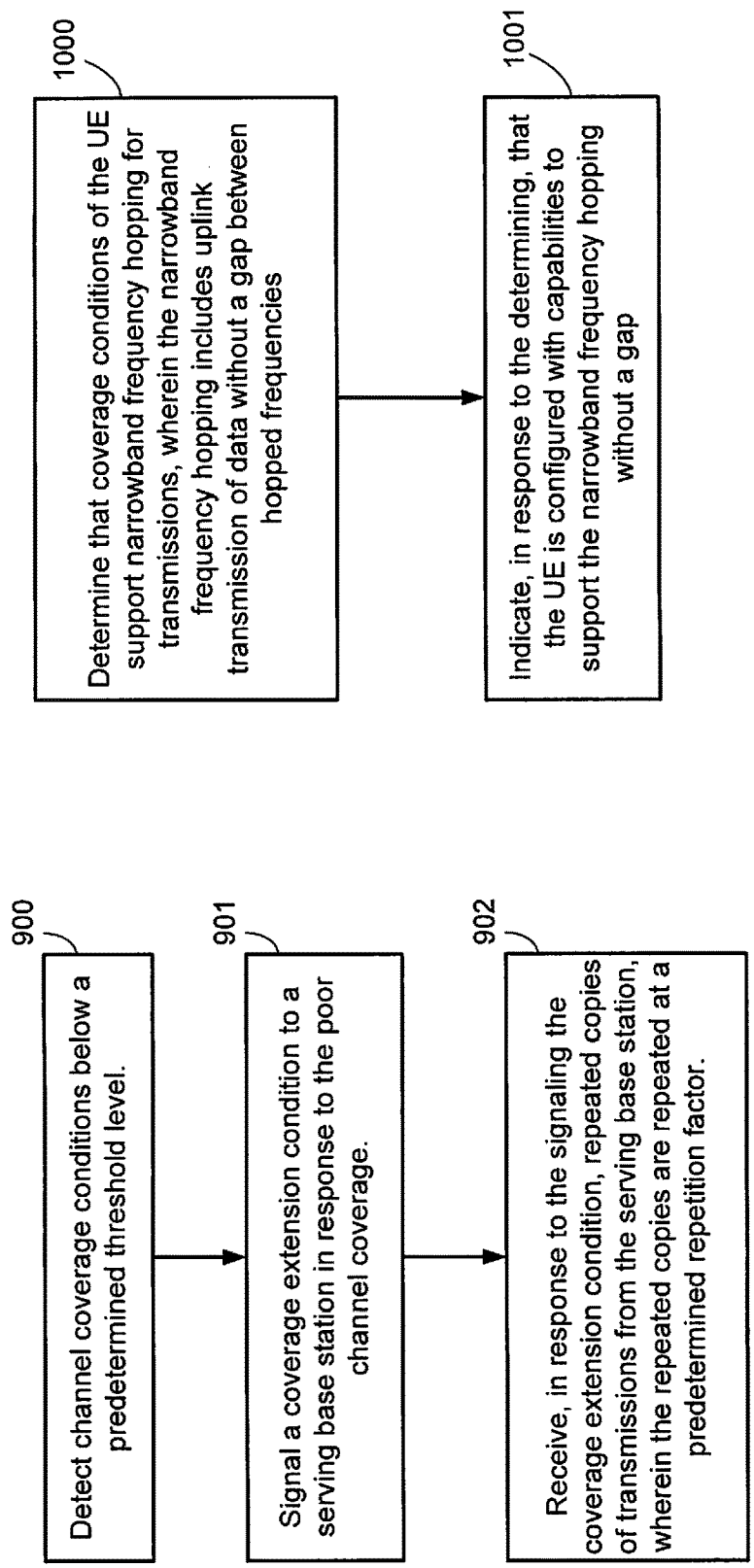
FIG. 9 is a block diagram illustrating example blocks executed to implement one aspect of the present disclosure.
FIG. 10 is a block diagram illustrating example blocks executed to implement an aspect of the present disclosure.

FIG. 9 is a block diagram illustrating example blocks executed to implement one aspect of the present disclosure. At block 900, a UE detects channel coverage conditions below a selected threshold level. For example, UE 115 takes channel measurements and performs measurements of the communication conditions it experiences in its location near base station 105.

At block 901, the UE signals a coverage extension condition to a serving base station in response to the poor channel coverage. For example, UE 115 signals base station 105 that channel conditions are so poor that a coverage extension condition exists.

At block 902, in response to the signaling the coverage extension condition, the UE receives repeated copies of transmissions from the serving base station, wherein the repeated copies are repeated at a selected repetition factor. In one aspect of the present disclosure, instead of requiring UE 115 to switch modes to improve coverage, repetition factors would be increased in the current, normal mode for existing channels in order to experience enhanced coverage in the current normal mode. For example, instead of supporting both ePDCCH for normal coverage and NPDCCH for extended coverage, the modem of UE 115 can simply support ePDCCH and repeated ePDCCH. This may simplify the receiver design and reduce receiver cost. The bundled channels subject to the repeated transmissions include one or more of: PDCCH, PDSCH, PUSCH, PUCCH, PRACH, PBCH, PSS, SSS. The repetition factors may be predetermined and communicated in control messages between UE 115 and base station 105.

Additional features for the machine type enhanced coverage standards include support of frequency hopping with narrowband frequencies to reduce transmission congestion. In order to support frequency hopping with narrowband frequencies, current NB-IoT or eMTC devices would typically perform frequency retuning. Thus, a gap is generally introduced between frequency hops to allow for the device to tune to the new frequency. However, more advanced UEs (e.g., non-machine-type devices) may have capabilities for baseband processing that support wideband frequencies. Accordingly, additional aspects of the present disclosure provide for regular UEs to define the same narrowband frequency hopping signaling across the wideband bandwidth capabilities of the UE. Therefore, such UEs may transmit at the narrowband frequency hops without inserting a retuning gap. Thus, depending on the UE capability, different groups of UEs may perform the narrowband frequency hopping differently. Less capable, machine-type UEs transmit with retuning gaps, while other, more capable UEs transmit without retuning gaps.

FIG. 10 is a block diagram illustrating example blocks executed to implement an aspect of the present disclosure. The example blocks will also be described with respect to UE 115, as illustrated in FIG. 12.

At block 1000, a UE determine that coverage conditions of the UE support narrowband frequency hopping for transmissions, wherein the narrowband frequency hopping includes uplink transmission of data without a gap between hopped frequencies. For example, UE 115, under control of controller/processor 280, may activate narrowband frequency hopping 1204, stored in memory 282. The execution environment of narrowband frequency hopping 1204 allows UE 115 to perform various measurements to determine the channel conditions and connection conditions at its current location, and whether those coverage conditions support narrowband frequency hopping for transmissions. UE 115 may be a regular smart phone capable of advanced communication operations in LTE-A.

At block 1001, the UE may indicate, in response to the determining, that the UE is configured with capabilities to support the narrowband frequency hopping without a gap.

For example, UE 115, under control of controller/processor 280, may indicate that the UE is configured with capabilities to support the narrowband frequency hopping. Additionally, because UE 115 is able to handle wideband baseband processing, there is no need to continually retune frequencies for each frequency hopped as each of the hopped frequencies falls within the total wideband bandwidth available to UE 115.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5-12 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   performing, at a user equipment (UE), measurements to determine coverage conditions, including channel conditions, at a current location of the UE, and whether those coverage conditions support narrowband frequency hopping for transmissions;

determining, at the UE, that the coverage conditions of the UE support narrowband frequency hopping for transmissions, wherein the narrowband frequency hopping includes uplink transmission of data without a gap between hopped frequencies; and indicating, by the UE and in response to the determining, that the UE is configured with capabilities to support the narrowband frequency hopping without a gap.

2. The method of claim 1, further comprising:

detecting, at the UE, the data for the uplink transmission, wherein the transmission of the data without the gap between hopped frequencies includes transmitting the data, by the UE, on the hopped frequencies without retuning a wideband baseband radio of the UE between two frequencies of the hopped frequencies.

3. The method of claim 2, wherein a first frequency of the hopped frequencies is a frequency of a first narrowband, and a second frequency of the hopped frequencies is a frequency of a second narrowband, and wherein the transmission of the data hops between the first and second frequency without retuning.

4. The method of claim 1, wherein the determining includes determining coverage conditions that support communications in a coverage extension (CE) mode, wherein the CE mode includes the narrowband frequency hopping without the gap.

5. The method of claim 1, wherein the transmission of the data without the gap includes narrowband frequency signaling.

6. The method of claim 1, wherein the UE is configured for advanced communication operations in Long Term Evolution Advanced (LTE-A).

7. The method of claim 1, further including:

determining, by the UE, that the UE is configured with lesser capabilities to support the narrowband frequency hopping with a retuning gap.

8. An apparatus configured for wireless communication, the apparatus comprising:

at least one processor; and a memory coupled to the at least one processor, wherein the at least one processor is configured:

to perform, at a user equipment (UE), measurements to determine coverage conditions, including channel conditions, at a current location of the UE, and whether those coverage conditions support narrowband frequency hopping for transmissions;

to determine, at the UE, that the coverage conditions of the UE support narrowband frequency hopping for transmissions, wherein the narrowband frequency hopping includes uplink transmission of data without a gap between hopped frequencies; and to indicate, by the UE and in response to the determination, that the UE is configured with capabilities to support the narrowband frequency hopping without a gap.

9. The apparatus of claim 8, further comprising configuration of the at least one processor:

to detect, at the UE, the data for the uplink transmission, wherein the transmission of the data without the gap between hopped frequencies includes transmitting the data, by the UE, on the hopped frequencies without retuning a wideband baseband radio of the UE between two frequencies of the hopped frequencies.

10. The apparatus of claim 9, wherein a first frequency of the hopped frequencies is a frequency of a first narrowband, and a second frequency of the hopped frequencies is a frequency of a second narrowband, and wherein the transmission of the data hops between the first and second frequency without retuning.

11. The apparatus of claim 8, wherein the configuration of the at least one processor to determine includes configuration of the at least one processor to determine coverage conditions that support communications in a coverage extension (CE) mode, wherein the CE mode includes the narrowband frequency hopping without the gap.

12. The apparatus of claim 8, wherein the transmission of the data without the gap includes narrowband frequency signaling.

13. The apparatus of claim 8, wherein the UE is configured for advanced communication operations in Long Term Evolution Advanced (LTE-A).

14. The apparatus of claim 8, further including configuration of the at least one processor to determine, by the UE, that the UE is configured with lesser capabilities to support the narrowband frequency hopping with a retuning gap.

15. The method of claim 1, wherein the indicating includes:

transmitting, by the UE to a base station, an indication in a dummy Non-Access Stratum (NAS) message or Radio Resource Control (RRC) message.

16. The method of claim 1, wherein the capabilities to support the narrowband frequency hopping without a gap correspond to ability of the UE to handle wideband baseband processing.

17. The method of claim 15, wherein the transmitting includes transmitting the indication in the dummy NAS message.

* * * * *